United States Patent
Choi et al.

(10) Patent No.: US 9,424,983 B2
(45) Date of Patent: Aug. 23, 2016

(54) THIN FILM COIL, SHIELD PART INCLUDING THE SAME, AND CONTACTLESS POWER TRANSMISSION DEVICE HAVING THE SHIELD PART

(71) Applicant: SAMSUNG ELECTRO-MECHANICS CO., LTD., Suwon (KR)

(72) Inventors: Kang Ryong Choi, Suwon (KR); Sung Yong An, Suwon (KR); Jeong Gu Yeo, Suwon (KR); Chang Ryul Jung, Suwon (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 770 days.

(21) Appl. No.: 13/895,608

(22) Filed: May 16, 2013

(65) Prior Publication Data
US 2014/0265612 A1    Sep. 18, 2014

(30) Foreign Application Priority Data
Mar. 13, 2013    (KR) .......................... 10-2013-0026942

(51) Int. Cl.
| | | |
|---|---|---|
| H02J 17/00 | (2006.01) | |
| H02J 50/10 | (2016.01) | |
| H02J 50/12 | (2016.01) | |
| H01F 27/36 | (2006.01) | |
| H01F 27/28 | (2006.01) | |
| H01F 38/14 | (2006.01) | |
| H01F 5/04 | (2006.01) | |

(52) U.S. Cl.
CPC .......... *H01F 27/365* (2013.01); *H01F 27/2804* (2013.01); *H01F 38/14* (2013.01); *H01F 5/04* (2013.01); *H02J 50/10* (2016.02); *H02J 50/12* (2016.02)

(58) Field of Classification Search
CPC ........... H01F 38/14; H02J 17/00; H02J 50/10; H02J 50/12
USPC .................................. 307/104; 336/200, 206
See application file for complete search history.

(56) References Cited

U.S. PATENT DOCUMENTS

| | | | | |
|---|---|---|---|---|
| 2007/0205855 A1* | 9/2007 | Hashimoto | ............. | H01F 5/003 336/200 |
| 2008/0197960 A1* | 8/2008 | Hasegawa | ........... | H01F 27/2871 336/110 |
| 2010/0253153 A1* | 10/2010 | Kondo | ................ | H01F 27/2876 307/104 |

(Continued)

FOREIGN PATENT DOCUMENTS

| | | |
|---|---|---|
| JP | 2005-340754 | 12/2005 |
| JP | 2008-205215 | 9/2008 |
| KR | 10-2013-0010797 | 1/2013 |

OTHER PUBLICATIONS

Machine translation for JP2005-340754.*

(Continued)

*Primary Examiner* — Fritz M Fleming
(74) *Attorney, Agent, or Firm* — McDermott Will & Emery LLP (57) ABSTRACT

There is provided a thin film coil, including a thin type coil pattern, and a coil lead-out portion including a lead-out line traversing the coil pattern from a central portion thereof and electrically connecting the central portion of the coil pattern to the outside thereof and a conductive adhesive layer electrically connecting the central portion of the coil pattern to the lead-out line.

12 Claims, 5 Drawing Sheets

(56) References Cited

U.S. PATENT DOCUMENTS

| | | | | |
|---|---|---|---|---|
| 2013/0181668 A1* | 7/2013 | Tabata | H01F 38/14 320/108 |
| 2013/0249302 A1* | 9/2013 | An | H01F 41/14 307/104 |
| 2015/0076919 A1* | 3/2015 | Park | H02J 5/005 307/104 |
| 2015/0194816 A1* | 7/2015 | Chang | H02J 5/005 307/104 |

OTHER PUBLICATIONS

Korean Office Action issued Feb. 4, 2014 in corresponding Korean Patent Application No. 10-2013-0026942.

* cited by examiner

THIN FILM COIL, SHIELD PART INCLUDING THE SAME, AND CONTACTLESS POWER TRANSMISSION DEVICE HAVING THE SHIELD PART

CROSS-REFERENCE TO RELATED APPLICATION

This application claims the priority of Korean Patent Application No. 10-2013-0026942 filed on Mar. 13, 2013, in the Korean Intellectual Property Office, the disclosure of which is incorporated herein by reference.

BACKGROUND OF THE INVENTION

1. Field of the Invention

The present invention relates to a thin film coil, a shield part including the same, and a contactless power transmission device having the shield part.

2. Description of the Related Art

Recently, systems for wirelessly, that is, contactlessly, transmitting power in order to charge a secondary cell rechargeable battery embedded in a portable terminal or the like are under development.

Typically, a contactless power transmission device includes a contactless power transmitter transmitting power and a contactless power receiver receiving and storing the transmitted power.

Such contactless power transmission devices transmit and receive power using electromagnetic induction. To this end, the contactless power transmitter and the contactless power receiver respectively include a coil therein.

In the contactless power transmission device according to the related art, this coil is wound in parallel with a bottom surface (that is, an external contact surface). In addition, the coil is fixed to the bottom surface by an adhesive, an adhesive sheet, or the like.

However, in the case of the contactless power transmission device according to the related art, an ordinary wire type coil is used so that the wound coil is overlapped and stacked. Therefore, a problem exists, in that a thickness of the contactless power transmission device increases due to a thickness of the coil, the turns of the coil, and the like.

Therefore, in accordance with the recent trend for thin devices, it is necessary to develop a contactless power transmission device having a reduced thickness.

To this end, a thin film coil, of a type of thin coil other than a wire type coil, is used so as to significantly reduce device thickness, as compared to case of using a wire type coil.

However, in the use of the thin film coil, the thickness of a lead-out portion, a portion thereof which traverses the thin film coil from the central portion of the thin film coil to form an external electrical connection, is inevitably increased.

Accordingly, the thickness of the thickest portion of the thin film coil is determined depending on the thickness of the lead-out portion of the thin film coil.

That is, in order to reduce the overall thickness of the contactless power transmission device, a technique of reducing the thickness of the thickest portion of the thin film coil is required.

The Related Art Document referenced below, relates to a lead-out portion of a coil in an electronic device, capable of being wirelessly charged.

However, unlike the present invention relating to the thin type coil, the coil discussed in the Related Art Document is of wire type and the thickness thereof is significantly thick.

Further, in the case of the wire type coil discussed in the Related Art Document, the lead-out portion may be formed by removing a portion of the shield part and then forming the lead-out portion in the removed portion of the shield part. However, such a scheme is not applicable to the thin type coil disclosed in the present invention.

RELATED ART DOCUMENT

Korean Patent Laid-open Publication No. 2013-0010797

SUMMARY OF THE INVENTION

An aspect of the present invention provides a thin film coil of which proximal and distal ends are electrically connected.

An aspect of the present invention provides a shield part in which a thin film coil is embedded in a magnetic sheet so that the thickness of the shield part including the coil is reduced.

An aspect of the present invention provides a contactless power transmission device which is thin and has increased efficiency in cordless charging and an increased communications distance.

According to an aspect of the present invention, there is provided a thin film coil, including: a thin type coil pattern; and a lead-out portion including a lead-out line traversing the coil pattern from a central portion thereof and electrically connecting the central portion of the coil pattern to the outside thereof, and a conductive adhesive layer electrically connecting the central portion of the coil pattern to the lead-out line.

The thin film coil may further include an insulation layer formed between the coil pattern and the lead-out line.

The conductive adhesive layer may be at least one selected from a group consisting of an anisotropic conductive film, a conductive polymer and a conductive metal.

A thickness of the conductive adhesive layer may be 5 to 30 μm.

A thickness of the coil pattern may be 5 to 95 μm.

According to an aspect of the present invention, there is provided a shield part, including: at least one or more magnetic sheets stacked on one another; a coil pattern formed on the magnetic sheets, at least one of the magnetic sheets having a groove formed in one surface or a through hole formed therein; and a coil lead-out portion embedded in the groove or through hole of the magnetic sheet, wherein the coil lead-out portion includes a lead-out line traversing the coil pattern from a central portion thereof and electrically connecting the central portion of the coil pattern to the outside thereof, and a conductive adhesive layer electrically connecting the central portion of the coil pattern to the lead-out line.

The magnetic sheets may include first to $n^{th}$ magnetic sheets stacked in order, and the first magnetic sheet may have the groove or through hole formed therein.

The magnetic sheets may include first to $n^{th}$ magnetic sheets layered from top to bottom, conductive vias in the first to $(n-1)^{th}$ magnetic sheets may be filled with conductive material, the conductive vias may electrically connect the central portion of the coil pattern to the conductive adhesive layer, and the $n^{th}$ magnetic sheet may have the groove or though hole formed therein.

The magnetic sheets may include first to $n^{th}$ magnetic sheets layered from top to bottom, conductive vias in the first to $(m-1)^{th}$ magnetic sheets (m<n) may be filled with conductive material, the conductive vias may electrically connect the central portion of the coil pattern to the conductive adhesive layer, and the $n^{th}$ magnetic sheet may have the groove or though hole formed therein.

The conductive adhesive layer may be at least one selected from a group consisting of an anisotropic conductive film, a conductive polymer and a conductive metal.

A thickness of the conductive adhesive layer may be 5 to 30 μm.

According to an aspect of the present invention, there is provided a contactless power transmission device, including: a shield part; a lead-out pad electrically connected to a lead-out line; a distal contact pad electrically connected to an externally exposed end of a coil; and a power supply inputting and outputting power to the lead-out pad and the distal contact pad, wherein the shield part includes: at least one or more magnetic sheets stacked on one another and a coil pattern formed on the magnetic sheets, at least one of the magnetic sheets having a groove formed in one surface or a through hole formed therein, and a coil lead-out portion embedded in the groove or through hole of the magnetic sheets, wherein the coil lead-out portion includes a lead-out line traversing the coil pattern from a central portion thereof and electrically connecting the central portion of the coil pattern to the outside thereof, and a conductive adhesive layer electrically connecting the central portion of the coil pattern to the lead-out line.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings. The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In describing embodiments, a contactless power transmission device generally refers to a contactless power transmitter transmitting power and a contactless power receiver receiving and storing transmitted power.

Embodiments of the present invention will be described in terms of a contactless power transmission device; however, it is also applicable to near field communications and is not limited to contactless power transmission.

Hereinafter, embodiments of the present invention will be described in detail with reference to FIGS. 1 through 10.

Figure 1:
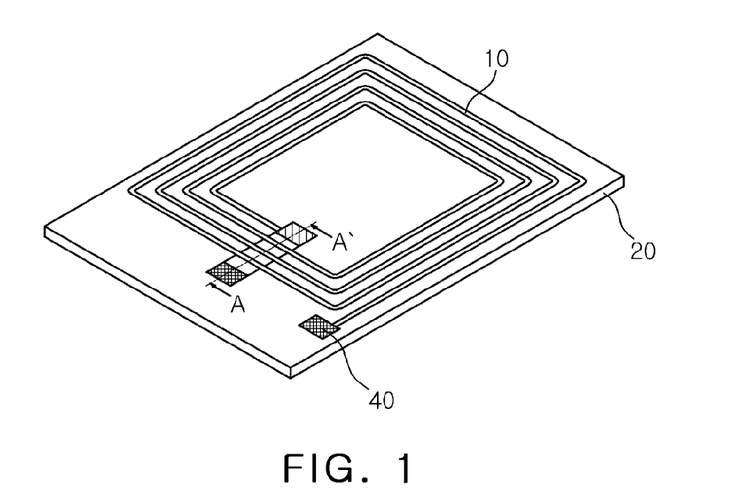
FIG. 1 is a schematic perspective view of a shield part according to an embodiment of the present invention.
Figure 2:
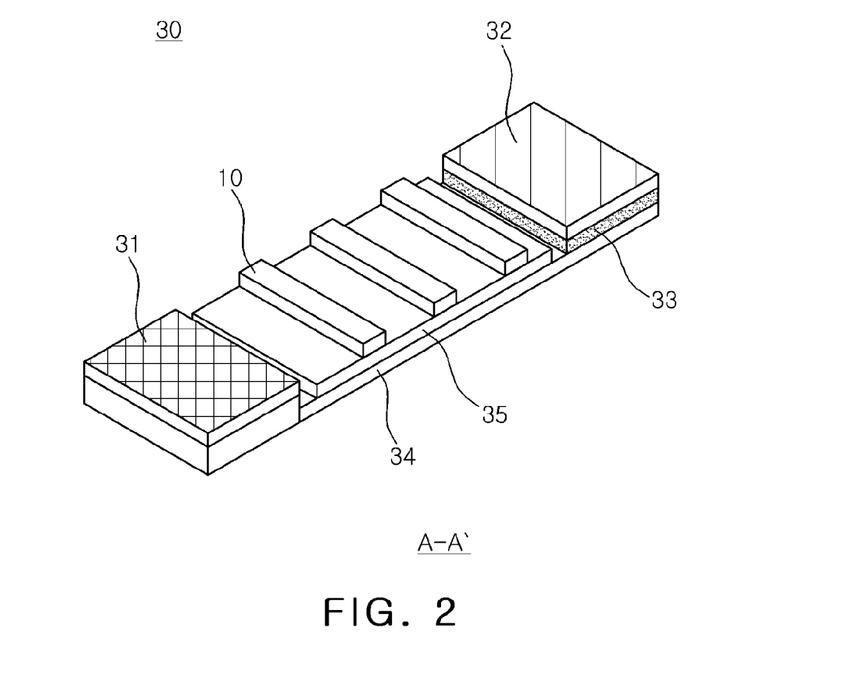
FIG. 2 is a schematic perspective view of a lead-out portion of a thin film coil embedded in a magnetic sheet, taken along line A-A' of FIG. 1.
Figure 3:
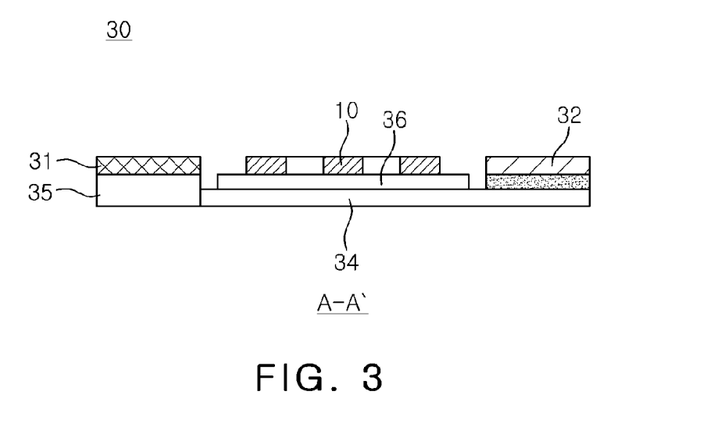
FIG. 3 is a schematic cross-sectional view of the lead-out portion shown in FIG. 2.

FIG. 1 is a perspective view schematically showing a shield part 30 according to an embodiment of the present invention; and FIG. 2 is a perspective view schematically showing a coil lead-out portion of a thin film coil embedded in a magnetic sheet, taken along line A-A' of FIG. 1. FIG. 3 is a cross-sectional view schematically illustrating the coil lead-out portion shown in FIG. 2.

Referring to FIGS. 1 through 3, the coil lead-out portion and the thin film coil including the same will be specifically described.

A thin film coil according to an embodiment of the present invention may include a coil pattern 10 formed as a thin type coil, and a coil lead-out portion that includes a lead-out line 34 traversing the coil pattern 10 from the central portion thereof and electrically connecting the central portion of the coil pattern 10 to the outside thereof and a conductive adhesive layer 33 electrically connecting the central portion of the coil pattern 10 to the lead-out line 34.

The coil pattern 10 may be a thin type coil and have a thickness between 5 and 95 μm.

The coil pattern 10 may be formed in a spiral pattern.

The coil pattern 10 may be formed in a spiral pattern and may have a proximal contact pad 32 formed at its proximal end.

The proximal contact pad 32 allows the conductive adhesive layer 33 at the coil lead-out portion to be connected to the proximal end of the coil pattern 10.

The central contact pad 32 may be formed of, but is not limited to, copper (Cu), and may be formed of a material having good electrical conductivity.

At the distal end of the coil pattern 10, a distal contact pad 40 may be formed.

The distal contact pad 40 may be formed of, but is not limited to, copper (Cu), and may be formed of a material having good electrical conductivity.

The proximal contact pad 32 may be electrically connected to the conductive adhesive layer 33.

The conductive adhesive layer 33 may be at least one selected from a group consisting of an anisotropic conductive film, a conductive polymer and a conductive metal, but the present invention is not limited thereto as long as it is conductive.

The conductive adhesive layer 33 may be an anisotropic conductive film (ACF).

The anisotropic conductive film refers to a polymer resin containing conductive metal particles.

When the anisotropic conductive film is heated and pressed, the conductive metal particles contained in the polymer resin are deformed, such that the conductive metal particles are electrically connected to each other.

The polymer resin may be, but is not limited to, an epoxy resin.

The conductive metal particles may be at least one selected from a group consisting of copper (Cu), gold (Au), aluminum (Al) and silver (Ag), but are not limited thereto.

A thickness of the conductive adhesive layer 33 may be 5 to 30 μm.

The conductive adhesive layer 33 may be electrically connected to the lead-out line 34.

The lead-out line 34 may be at least one selected from a group consisting of copper (Cu), gold (Au), aluminum (Al) and silver (Ag), but is not limited thereto.

A thickness of the lead-out line 34 may be 5 to 95 μm.

In the related art in which a coil of ordinary wire, rather than thin type wire, is used, the thickness of the coil is approximately 0.3 mm.

In particular, in the case that a lead-out line according to the related art is led out from the central portion of a coil, the thickness of the coil is approximately 0.6 mm.

However, in the thin film coil according to an embodiment of the present invention, the thickness of the coil pattern may be 5 to 95 μm, the thickness of the conductive adhesive layer 33 may be 5 to 30 μm, and the thickness of the lead-out line 34 may be 5 to 95 μm, such that the thickness of the thickest part thereof may be 220 μm or less.

An insulation layer 36 may be further provided between the lead-out line 34 and the coil pattern 10 to electrically insulate one from the other.

Any material that can provide electrical insulation may be used for the insulation layer 36, and an epoxy may be used.

The insulation layer 36 may contain magnetic powder particles in order to prevent leakage of the magnetic flux generated in the coil.

The magnetic powder particles may be, but are not limited to, ferrite powder particles.

The lead-out line 34 is electrically connected to the lead-out pad 31 through a connection part 35, such that the central portion of the coil pattern 10 may be electrically connected to the lead-out pad 31.

The connection part 35 may be at least one selected from a group consisting of an anisotropic conductive film, a conductive polymer and a conductive metal, but the present invention is not limited thereto as long as it is conductive.

The connection part 35 may be formed by soldering for the sake of easy processing and price competitiveness.

Figure 4:
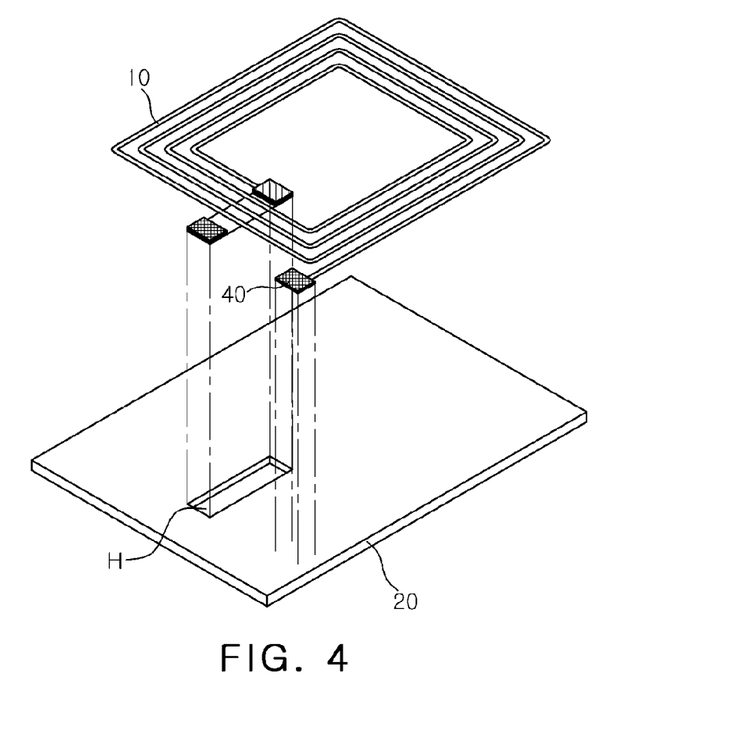
FIG. 4 is an exploded perspective view schematically showing the shield part according to the embodiment shown in FIG. 1.

FIG. 4 is an exploded perspective view schematically showing the shield part 30 according to the embodiment shown in FIG. 1; and FIGS. 5 through 9 are schematic cross-sectional views of shield parts 30 according to embodiments, taken along line A-A' of FIG. 1.

Referring to FIGS. 4 through 9, shield parts 30 according to various embodiments will be described.

Figure 5:
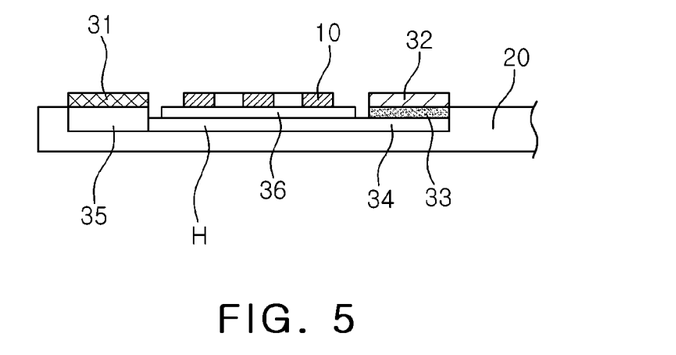
FIG. 5 is a schematic cross-sectional view of a shield part according to an embodiment, taken along line A-A' of FIG. 1.

FIG. 5 is a schematic cross-sectional view of a shield part 30 according to an embodiment of the present invention.

Referring to FIG. 5, the shield part 30 according to this embodiment may include at least one or more magnetic sheets 20 stacked on one another, and a coil pattern 10 formed on the magnetic sheets 20, in which a groove H is formed in one surface of at least one of the magnetic sheets 20, a coil lead-out portion is embedded in the groove H of the magnetic sheets 20, and the coil lead-out portion may include a lead-out line 34 traversing the coil pattern 10 from the central portion of the coil pattern 10 and electrically connecting the central portion of the coil pattern 10 externally, and a conductive adhesive layer 33 electrically connecting the central portion of the coil pattern 10 to the lead-out line 34.

In the shield part 30 according to this embodiment of the invention, the coil lead-out portion of the thin film coil is embedded in the groove H formed in one surface of one of the magnetic sheets 20, such that the thickness of the shield part 30 may be reduced.

A coil lead-out portion according to the related art is formed to traverse an upper portion of a coil pattern 10 so as to deliver current input from the central portion of the coil pattern 10 and the outside, such that the coil lead-out portion is the thickest portion of the thin film coil.

Further, the coil pattern 10 according to the related art is formed on a printed circuit board or a film and then bonded to the shield part 30.

In contrast, in the shield part 30 according to the embodiment of the present invention, a groove H is formed in one surface of one of the magnetic sheets 20 and then the coil lead-out portion may be embedded therein.

Accordingly, the thickest portion of the thin film coil is embedded in the groove H on one of the magnetic sheets 20, such that the thickness of the thickest portion of the shield part 30 may be reduced.

Further, the coil pattern 10 according to the embodiment of the invention may be formed directly on the magnetic sheets.

Accordingly, no separate printed circuit board or film is required to form the coil pattern 10, and thus the thickness of the shield part 30 may be reduced to correspond to the thickness of the printed circuit board or film.

The coil pattern 10 may be formed on the magnetic sheet by etching, plating, printing and the like, but the present invention is not limited thereto.

In addition, since the coil pattern 10 is formed directly on the magnetic sheet, the efficiency of cordless charging in a contactless power transmission device may be increased and the effective distance of near field communications may be increased.

The magnetic sheet 20 may be formed of, but is not limited to, a ferrite sheet, an amorphous metal, and a metal powder.

The ferrite sheet may be at least one selected from a group consisting of NiZnCu, MnZn, and (M, Y, W or Z)-type ferrites, but the present invention is not limited thereto.

The amorphous metal may be at least one selected from a group consisting of Ni-, Fe- and Co-based amorphous metals, but the present invention is not limited thereto.

In the case that the sheet is formed of the metal power, a resin may be at least one selected from a group consisting of chlorinated polyethylene, polypropylene and ethylene propylene rubber, natural rubber, acrylonitrile butadiene resin, polyvinyl chloride, polyimide resin and polyester resin, but the present invention is not limited thereto.

Figure 6:
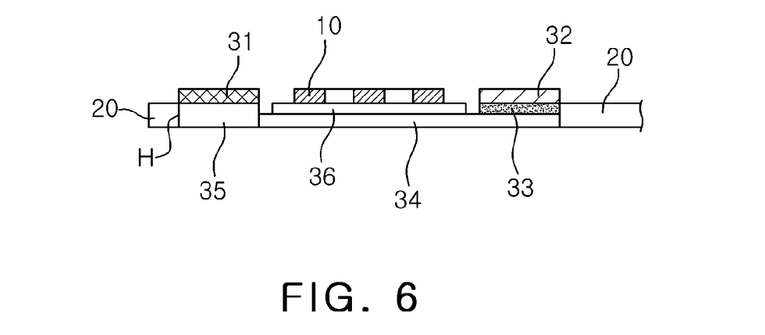
FIG. 6 is a schematic cross-sectional view of a shield part according to another embodiment, taken along line A-A' of FIG. 1.

FIG. 6 is a schematic cross-sectional view of a shield part 30 according to another embodiment of the present invention.

Referring to FIG. 6, the shield part 30 according to this embodiment may include at least one or more magnetic sheets 20 stacked on one another, and a coil pattern 10 formed on the magnetic sheets 20, in which a through hole H is formed in at least one of the magnetic sheets 20, a coil lead-out portion is embedded in the through hole H of the magnetic sheets 20, and the coil lead-out portion may include a lead-out line 34 traversing the coil pattern 10 from the central portion of the coil pattern and electrically connecting the central portion of the coil pattern 10 externally, and a conductive adhesive layer 33 electrically connecting the central portion of the coil pattern 10 to the lead-out line 34.

In the shield part 30 according to this embodiment of the invention, the coil lead-out portion of the thin film coil is embedded in the through hole H formed in one of the magnetic sheets 20, such that the thickness of the shield part 30 is reduced.

In particular, the shield part 30 according to this embodiment substantially reduces the thickness of the magnetic sheet by forming the through hole H.

Moreover, the process for forming the through hole H is easier and simpler than the process for forming the groove H and, therefore, more commercially viable.

In the embodiments shown in FIGS. 5 and 6, a plurality of magnetic sheets may be further included at the bottom of the shield part.

By stacking the magnetic sheets 20, leakage of magnetic flux is prevented so that the efficiency of the power transmission device is increased and the effective distance of near field communications is also increased.

That is, in the above-described embodiments of the present invention, the plurality of magnetic sheets may be further included at the bottom of the shield part, which include the first to $n^{th}$ magnetic sheets stacked in order, and the first magnetic sheet has the groove H or the through hole H formed therein.

After the plurality of magnetic sheets 20 are stacked, they are heated and pressed to be bonded to each other.

During the process of heating and pressing the magnetic sheets 20, metal particles within an anisotropic conductive film in the conductive adhesive layer 33 of the shield part 30 are allowed to contact and conduct one another.

Accordingly, when the conductive adhesive layer 33 is formed using the anisotropic conductive film, no separate process is required for electrically connecting the proximal contact pad 32 to the lead-out line 34.

Figure 7:
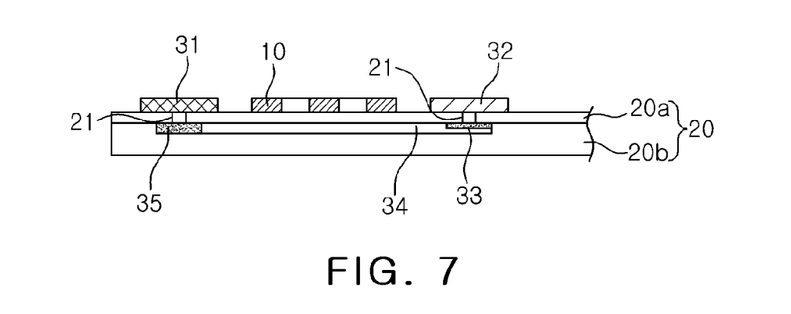
FIG. 7 is a schematic cross-sectional view of a shield part according to another embodiment, taken along line A-A' of FIG. 1.

FIG. 7 is a schematic cross-sectional view of a shield part 30 according to another embodiment of the present invention.

Referring to FIG. 7, in a shield part 30 according to an embodiment of the present invention, the magnetic sheet 20 includes the first to $n^{th}$ magnetic sheets 20a and 20b layered from top to bottom, the conductive via 21 of the first to $(n-1)^{th}$ magnetic sheets 20a is filled with conductive material, the conductive via 21 electrically connects the central portion of the coil pattern to the conductive adhesive layer, and the groove H or the through hole H is formed in the $n^{th}$ magnetic sheet 20b.

For instance, as shown in FIG. 7, when the first sheet 20a and the second sheet 20b are named in the stacking direction, the conductive via 21 may be formed in the first magnetic sheet 20a and the groove H or the through hole H may be formed in the second sheet.

That is, in the shield part 30 according to this embodiment, the first magnetic sheet 20a is positioned between the coil pattern 10 and the lead-out line 34.

Accordingly, no separate insulation layer 36 is required, and the first magnetic sheet 30a may serve as the insulation layer.

Figure 8:
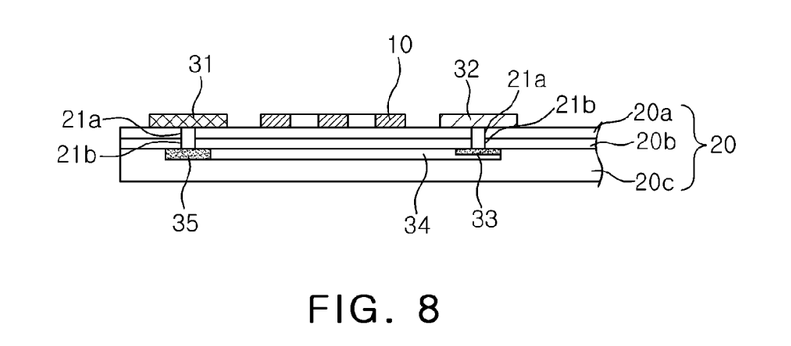
FIG. 8 is a schematic cross-sectional view of a shield part according to another embodiment, taken along line A-A' of FIG. 1.

FIG. 8 is a schematic cross-sectional view of a shield part 30 according to another embodiment of the present invention.

Referring to FIG. 8, in a shield part 30 according to an embodiment of the present invention, the magnetic sheets 20 include the first to $n^{th}$ magnetic sheets 20a, 20b and 20c layered from top to bottom, conductive vias 21a and 21 b of the first to $(n-1)^{th}$ magnetic sheets 20a and 20b are filled with conductive material, the conductive via 21 electrically connects the central portion of the coil pattern to the conductive adhesive layer, and the $n^{th}$ magnetic sheet 20b has the groove H or through hole H formed therein.

For instance, as shown in FIG. 8, when the first sheet 20a, the second magnetic sheet 20b and the third sheet 20c are named in the stacking direction, the conductive vias 21a and 21b may be formed in the first and second magnetic sheets 20a and 20b and the groove H or the through hole H may be formed in the third magnetic sheet 20c.

That is, even when the number of the magnetic sheets 20 is increased, the position at which the lead-out portion is formed may be adjusted using the via 21.

Figure 9:
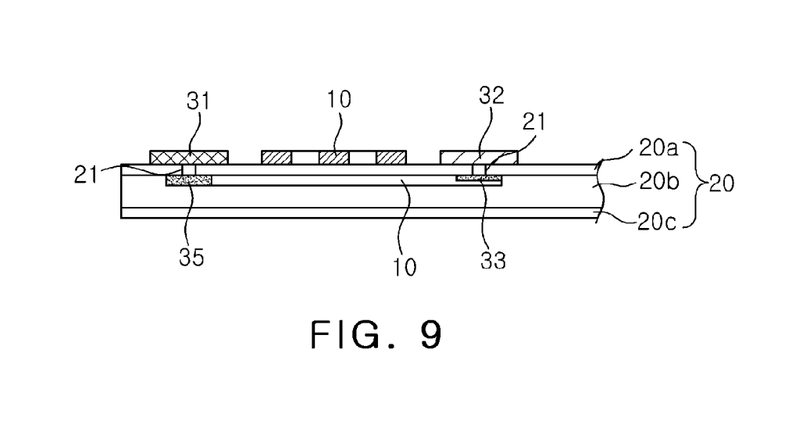
FIG. 9 is a schematic cross-sectional view of a shield part according to another embodiment, taken along line A-A' of FIG. 1.

FIG. 9 is a schematic cross-sectional view of a shield part 30 according to another embodiment of the present invention.

Referring to FIG. 9, in a shield part 30 according to an embodiment of the present invention, the magnetic sheets 20 include the first to $n^{th}$ magnetic sheets 20a, 20b and 20c layered from top to bottom, conductive vias 21a of the first to $(m-1)^{th}$ magnetic sheets 20a (m<n) are filled with conductive material, the conductive via 21a electrically connects the central portion of the coil pattern 10 to the conductive adhesive layer 33, and the $m^{th}$ magnetic sheet 20b has the groove H and through hole H formed therein.

For instance, as shown in FIG. 9, when the first sheet 20a, the second magnetic sheet 20b and the third sheet 20c are named in the stacking direction, the conductive vias 21a may be formed in the first magnetic sheet 20a and the groove H or the through hole H may be formed in the second magnetic sheet 20b.

That is, the coil lead-out portion may be formed in the middle of the magnetic sheet 10.

In this configuration, the first to $(m-1)^{th}$ magnetic sheets 20a, positioned above the $m^{th}$ magnetic sheet 20b, are positioned between the coil pattern 10 and the lead-out line 34.

Accordingly, no separate insulation layer 36 is required, and the first to $(m-1)^{th}$ magnetic sheets 20a may serve as the insulation layer 33.

Further, in this case, a lead-out pad 31 may be exposed to a side of the magnetic sheet 20.

That is, in the shield part 30 according to this embodiment, it is easy to change the location of the lead-out pad 31 as necessary.

Figure 10:
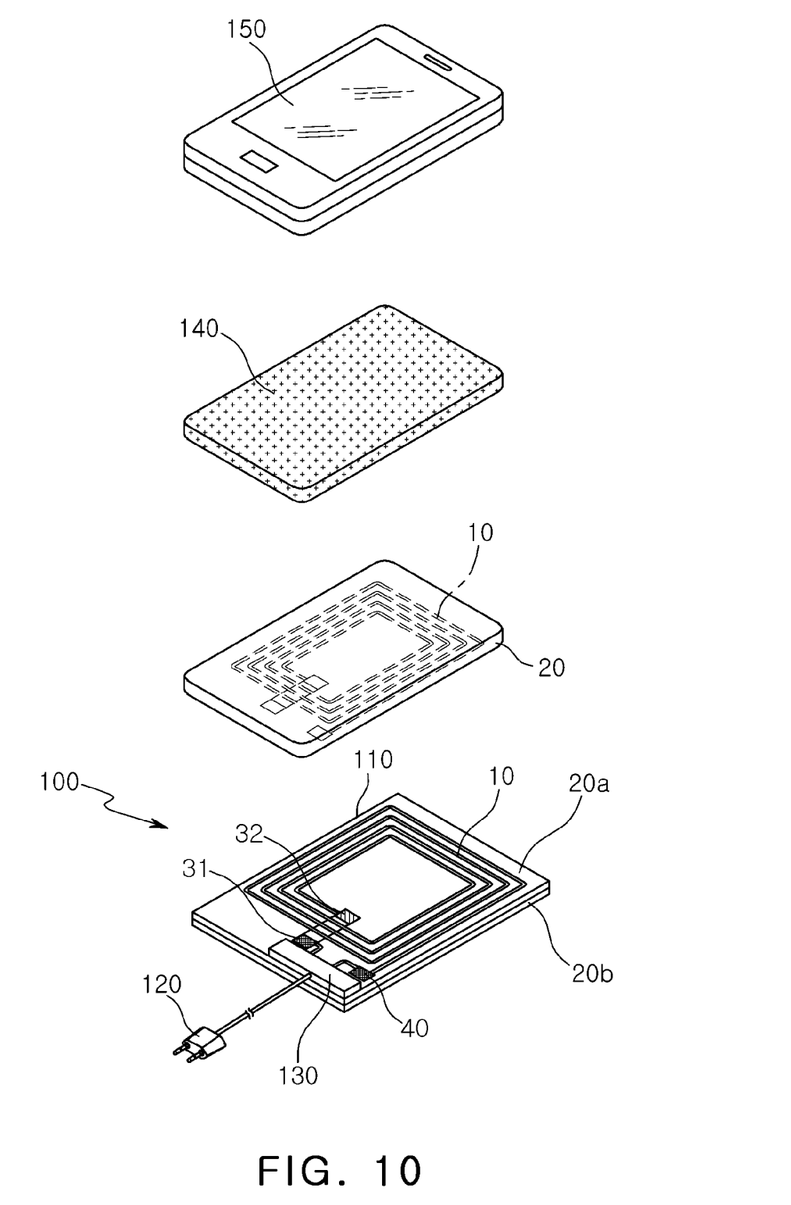
FIG. 10 is a schematic perspective view of a contactless power transmission device including a shield part according to an embodiment of the present invention.

FIG. 10 is a schematic perspective view of a contactless power transmission device including a shield part 30 according to an embodiment of the present invention.

Referring to FIG. 10, a contactless power transmission device 100 according to another embodiment of the present invention may include a shield part 30, a lead-out pad 31 electrically connected to a lead-out line 34, a distal contact pad 40 electrically connected to an externally exposed end of a coil pattern 10, and a power supply inputting and outputting power to the lead-out pad 31 and the distal contact pad 40, the shield part 30 includes at least one or more magnetic sheets 20 stacked on one another and a coil pattern 10 formed on the magnetic sheets 20, at least one of the magnetic sheets 20 having a groove H formed in one surface thereof or a through hole H formed therein, and a coil lead-out portion is embedded in the groove H or through hole H of the magnetic sheets 20, wherein the coil lead-out portion includes a lead-out line 34 traversing the coil pattern 10 from a central portion of the coil pattern 10 and electrically connecting the central portion of the coil pattern 10 externally, and a conductive adhesive layer 33 electrically connecting the central portion of the coil pattern to the lead-out line 34.

Describing an operational principle of the contactless power transmission device 100, commercially available alternating current (AC) power is received by an external power supply unit 120 of the contactless power transmitter.

The received commercially available AC power is converted into direct current (DC) power by a power converting unit 130, is then converted into an AC voltage having a specific frequency, and is provided to the thin film coil.

When the AC voltage is applied to the thin film coil of the contactless power transmitter, magnetic field around the coil pattern 10 is changed.

As the magnetic field of the coil pattern 10 of the contactless power receiver disposed to be adjacent to the contactless power transmitter is changed, the coil part of the contactless power receiver outputs power to charge the secondary cell rechargeable battery 140.

The magnetic sheet 20 of the contactless power receiver may prevent the induced magnetic field generated from the coil pattern 10 from influencing the electronic device 150.

Further, the induced magnetic field generated from the coil pattern 10 results in eddy loss in the secondary cell rechargeable battery 140, to thereby decrease the charging efficiency of the contactless power transmitter 100.

The magnetic sheet 20 blocks the induced magnetic field influencing the secondary cell rechargeable battery 140 to thereby prevent eddy loss from occurring, such that the charging efficiency of the contactless power transmitter 100 may be increased.

Table 1 below represents the efficiency of the contactless power transmitter 100 according to the thickness of the magnetic sheet 20 of the contactless power transmitter 100 using the shield part 30 according to the embodiment of the present invention.

TABLE 1

| Thickness of magnetic sheet (μm) | Efficiency without secondary cell rechargeable battery (%) | Efficiency with secondary cell rechargeable battery (%) |
|---|---|---|
| 70 | 65.09 | 47.96 |
| 80 | 65.09 | 49.26 |
| 90 | 67.40 | 58.79 |
| 100 | 67.40 | 65.09 |
| 150 | 70.10 | 67.50 |

The charging efficiency represents the charging efficiency of the contactless power transmitter assuming that wired charging efficiency is 100%.

As can be seen from Table 1, with the secondary cell rechargeable battery, eddy loss occurs and the efficiency of the contactless power transmitter 100 is decreased.

However, it can be seen that as the thickness of the magnetic sheet 20 is increased, the efficiency of the contactless power transmitter 100 is increased.

That is, it can be seen that when the thickness of the magnetic sheet 20 is below 100 μm, charging efficiency dramatically drops to 60% or less.

Charging efficiency is increased as the thickness of the magnetic sheet 20 is increased. However, when the magnetic sheet 20 becomes too thick, it becomes commercially less viable and less applicable to an electronic device.

The contactless power transmission device and the method of fabricating the same according to the embodiments of the present invention described above are not limited to the above-mentioned embodiments, but may be variously applied.

In addition, although the contactless power receiver used in the electronic apparatus has been described according to the above-mentioned embodiments by way of example, the contactless power receiver according to the present invention is not limited thereto, but may be widely used in all electronic apparatuses capable of being used by charging power therein and all power transmission devices capable of transmitting the power.

As set forth above, according to embodiments of the present invention, shield parts have an embedding groove or through hole formed therein that is formed so that a lead-out portion of a coil pattern is embedded in the embedding groove or though hole, thereby reducing the overall thickness of the shield part.

Further, since the magnetic sheet and the coil pattern are integrally manufactured, the efficiency of a contactless power transmission device including such a shield part can be increased, and a communications distance can be increased.

While the present invention has been shown and described in connection with the embodiments, it will be apparent to those skilled in the art that modifications and variations can be made without departing from the spirit and scope of the invention as defined by the appended claims.

What is claimed is:

1. A thin film coil, comprising:
a thin type coil pattern; and
a coil lead-out portion including a lead-out line traversing the coil pattern from a central portion thereof and electrically connecting the central portion of the coil pattern to the outside thereof, and a conductive adhesive layer electrically connecting the central portion of the coil pattern to the lead-out line.

2. The thin film coil of claim 1, further comprising an insulation layer formed between the coil pattern and the lead-out line.

3. The thin film coil of claim 1, wherein the conductive adhesive layer is at least one selected from a group consisting of an anisotropic conductive film, a conductive polymer and a conductive metal.

4. The thin film coil of claim 1, wherein a thickness of the conductive adhesive layer is 5 to 30 μm.

5. The thin film coil of claim 1, wherein a thickness of the coil pattern is 5 to 95 μm.

6. A shield part, comprising:
at least one or more magnetic sheets stacked on one another;
a coil pattern formed on the magnetic sheets, at least one of the magnetic sheets having a groove formed in one surface or a through hole formed therein; and
a coil lead-out portion embedded in the groove or through hole of the magnetic sheet,
wherein the coil lead-out portion includes a lead-out line traversing the coil pattern from a central portion thereof and electrically connecting the central portion of the coil pattern to the outside thereof, and a conductive adhesive layer electrically connecting the central portion of the coil pattern to the lead-out line.

7. The shield part of claim 6, wherein the magnetic sheets include first to $n^{th}$ magnetic sheets layered from top to bottom, and the first magnetic sheet has the groove or through hole formed therein.

8. The shield part of claim 6, wherein the magnetic sheets include first to $n^{th}$ magnetic sheets layered from top to bottom, conductive vias in the first to $(n-1)^{th}$ magnetic sheets are filled with conductive material, the conductive vias electrically connect the central portion of the coil pattern to the conductive adhesive layer, and the $n^{th}$ magnetic sheet has the groove or though hole formed therein.

9. The shield part of claim 6, wherein the magnetic sheets include first to $n^{th}$ magnetic sheets layered from top to bottom, conductive vias in the first to $(m-1)^{th}$ magnetic sheets (m<n) are filled with conductive material, the conductive vias electrically connect the central portion of the coil pattern to the conductive adhesive layer, and the $m^{th}$ magnetic sheet has the groove or though hole formed therein.

10. The shield part of claim 6, wherein the conductive adhesive layer is at least one selected from a group consisting of an anisotropic conductive film, a conductive polymer and a conductive metal.

11. The shield part of claim 6, wherein a thickness of the conductive adhesive layer is 5 to 30 μm.

12. A contactless power transmission device, comprising:
a shield part;
a lead-out pad electrically connected to a lead-out line;
a distal contact pad electrically connected to an externally exposed end of a coil pattern; and
a power supply unit inputting and outputting power to the lead-out pad and the distal contact pad,
wherein the shield part includes: at least one or more magnetic sheets stacked on one another and a coil pattern formed on the magnetic sheets, at least one of the magnetic sheets having a groove formed in one surface thereof or a through hole formed therein, and a coil lead-out portion embedded in the groove or through hole of the magnetic sheets, wherein the coil lead-out portion includes a lead-out line traversing the coil pattern from a central portion thereof and electrically connecting the central portion of the coil pattern to the outside thereof, and a conductive adhesive layer electrically connecting the central portion of the coil pattern to the lead-out line.

\* \* \* \* \*